United States Patent
Kato et al.

(10) Patent No.: US 12,214,670 B2
(45) Date of Patent: Feb. 4, 2025

(54) VEHICLE DRIVE DEVICE

(71) Applicant: AISIN CORPORATION, Aichi (JP)

(72) Inventors: Hiroshi Kato, Kariya (JP); Takuyo Maeda, Kariya (JP); Kyosuke Komizo, Kariya (JP); Shohei Tokoro, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/029,444

(22) PCT Filed: Dec. 3, 2021

(86) PCT No.: PCT/JP2021/044475
§ 371 (c)(1),
(2) Date: Mar. 30, 2023

(87) PCT Pub. No.: WO2022/138072
PCT Pub. Date: Jun. 30, 2022

(65) Prior Publication Data
US 2023/0364979 A1    Nov. 16, 2023

(30) Foreign Application Priority Data
Dec. 25, 2020  (JP) .................... 2020-217700

(51) Int. Cl.
*B60K 6/40*      (2007.10)
*B60K 6/365*     (2007.10)
(Continued)

(52) U.S. Cl.
CPC .............. *B60K 6/40* (2013.01); *B60K 6/365* (2013.01); *B60K 6/387* (2013.01); *B60K 6/442* (2013.01);
(Continued)

(58) Field of Classification Search
CPC ...... F16H 2200/2005; F16H 2200/2035–2061; F16H 3/54–64; F16H 37/0806; B60K 6/20–547
See application file for complete search history.

(56) References Cited

U.S. PATENT DOCUMENTS 7,090,607 B2    8/2006   Yamauchi et al.
7,322,897 B2    1/2008   Yamauchi et al.
(Continued)

FOREIGN PATENT DOCUMENTS

DE    102015215256 A1 *   2/2017
EP       3453549 A1        3/2019
(Continued)

OTHER PUBLICATIONS

Mitsuharu, machine translated by google of JP-2017171258A "Hybrid Drive Device", 2017, 41 pages (Year: 2017).*
(Continued)

*Primary Examiner* — Ernesto A Suarez
*Assistant Examiner* — Lillian T Nguyen
(74) *Attorney, Agent, or Firm* — Oliff PLC

(57) ABSTRACT

A transmission mechanism transmits rotation transmitted from a distribution differential gear mechanism to an output member. The distribution differential gear mechanism, a first distribution output gear, and a first engagement device are disposed on a first axis. A first rotary electric machine and a first rotary electric machine drive gear are disposed on a second axis. A transmission engagement device of the transmission mechanism is disposed on a third axis. An axial direction of the first rotary electric machine includes a first axial side where the first rotary electric machine is disposed with respect to the first rotary electric machine drive gear, and a second axial side opposite to the first axial side. The distribution differential gear mechanism is disposed on the (Continued)

second axial side of the first distribution output gear and the first engagement device.

8 Claims, 6 Drawing Sheets

(51) Int. Cl.
*B60K 6/387* (2007.10)
*B60K 6/442* (2007.10)
*B60K 17/16* (2006.01)
*F16H 3/091* (2006.01)
*F16H 37/08* (2006.01)
*B60K 6/52* (2007.10)

(52) U.S. Cl.
CPC ....... *B60K 17/165* (2013.01); *F16H 37/0806* (2013.01); *B60K 6/52* (2013.01); *B60Y 2200/92* (2013.01)

(56) References Cited

U.S. PATENT DOCUMENTS

| | | |
|---|---|---|
| 2005/0101425 A1 | 5/2005 | Yamauchi et al. |
| 2006/0247083 A1 | 11/2006 | Yamauchi et al. |
| 2015/0211615 A1* | 7/2015 | Yang ........................ B60K 6/52 180/65.23 |
| 2016/0207392 A1* | 7/2016 | Zhang ...................... B60K 6/52 |
| 2019/0126735 A1* | 5/2019 | Hwang .................. B60K 6/547 |
| 2019/0291563 A1* | 9/2019 | Ogino .................... B60K 17/04 |
| 2020/0047603 A1* | 2/2020 | Park .................... F16H 37/0826 |
| 2020/0106337 A1* | 4/2020 | Devaraj .................... B60K 1/00 |
| 2021/0146767 A1 | 5/2021 | Gassmann |
| 2021/0252973 A1* | 8/2021 | Engerman ............ B60K 17/046 |

FOREIGN PATENT DOCUMENTS

| | | |
|---|---|---|
| JP | 2004-222462 A | 8/2004 |
| JP | 2006-254570 A | 9/2006 |
| JP | 2009-107491 A | 5/2009 |
| JP | 2016-203898 A | 12/2016 |
| JP | 2017-171258 A | 9/2017 |
| JP | 2020-525358 A | 8/2020 |

OTHER PUBLICATIONS

Feb. 8, 2022 International Search Report issued in International Patent Application No. PCT/JP2021/044475.

Feb. 7, 2024 Extended European Search Report issued in European Patent Application No. 21910224.1.

* cited by examiner

Fig.6

|  | CL1 | CL2 | CLt |
|---|---|---|---|
| eTC MODE | ○ | × | Lo |
| FIRST EV MODE | × | ○ | Lo |
| SECOND EV MODE | × | ○ | Hi |
| FIRST HV MODE | ○ | ○ | Lo |
| SECOND HV MODE | ○ | ○ | Hi |
| CHARGING MODE | ○ | ○ | N |

VEHICLE DRIVE DEVICE

TECHNICAL FIELD

The present disclosure relates to a vehicle drive device including an input member drivingly connected to an internal combustion engine, an output member drivingly connected to wheels, a rotary electric machine, a transmission mechanism including a transmission engagement device for switching the state of power transmission, and a distribution differential gear mechanism.

BACKGROUND ART

An example of such a vehicle drive device is disclosed in Patent Document 1 below. In the description of "BACKGROUND ART" and "Problem to be Solved by the Invention", signs used in Patent Document 1 are shown in parentheses.

The vehicle drive device of Patent Document 1 includes an input member (8) drivingly connected to an internal combustion engine (3), an output member (7) drivingly connected to wheels, a rotary electric machine (4), a distribution differential gear mechanism (10) that is a planetary gear mechanism including a first rotation element (11), a second rotation element (12), and a third rotation element (13), a distribution output gear connected to the second rotation element (12) so as to rotate integrally with the second rotation element (12), a transmission mechanism (19) that shifts rotation of the distribution output gear and transmits it to the output member (7), and a disconnection engagement device (17) that connects or disconnects power transmission between the input member (8) and the first rotation element (11).

RELATED ART DOCUMENTS

Patent Documents

Patent Document 1: Japanese Unexamined Patent Application Publication (Translation of PCT Application) No. 2020-525358 (JP 2020-525358 A)

SUMMARY OF THE DISCLOSURE

Problem to be Solved by the Invention

In the vehicle drive device described above, the input member (8), the disconnection engagement device (17), the distribution differential gear mechanism (10), and the distribution output gear are disposed coaxially and arranged in an axial direction. Therefore, there is a problem that the axial dimension of the vehicle drive device is likely to increase.

In view of this, there is a demand to realize a vehicle drive device whose axial dimension can easily be reduced in the configuration including the input member, the output member, the rotary electric machine, the distribution differential gear mechanism, the transmission mechanism, and the disconnection engagement device.

Means for Solving the Problem

As the characteristic configuration of the vehicle drive device in view of the above, the vehicle drive device includes:
  an input member drivingly connected to an internal combustion engine;
  an output member drivingly connected to wheels;
  a rotary electric machine including a rotor;
  a rotary electric machine drive gear drivingly connected to the rotor;
  a transmission mechanism including a transmission engagement device configured to switch a state of power transmission;
  a distribution differential gear mechanism including a first rotation element drivingly connected to the input member, a second rotation element drivingly connected to the transmission mechanism, and a third rotation element drivingly connected to the rotary electric machine drive gear;
  a first distribution output gear connected to the second rotation element so as to rotate integrally with the second rotation element; and
  a disconnection engagement device configured to connect or disconnect power transmission between the input member and the first rotation element, in which
  the transmission mechanism is configured to transmit rotation transmitted from the distribution differential gear mechanism to the output member,
  the distribution differential gear mechanism, the first distribution output gear, and the disconnection engagement device are disposed on a first axis,
  the rotary electric machine and the rotary electric machine drive gear are disposed on a second axis different from the first axis,
  the transmission engagement device is disposed on a third axis different from the first axis and the second axis,
  an axial direction of the rotary electric machine includes a first axial side where the rotary electric machine is disposed with respect to the rotary electric machine drive gear, and a second axial side opposite to the first axial side, and
  the distribution differential gear mechanism is disposed on the second axial side of the first distribution output gear and the disconnection engagement device.

According to this characteristic configuration, the combination of the distribution differential gear mechanism, the first distribution output gear, and the disconnection engagement device, the combination of the rotary electric machine and the rotary electric machine drive gear, and the transmission engagement device are disposed on different axes. Thus, the dimension of the vehicle drive device in the axial direction can easily be reduced compared to a configuration in which some or all of them are disposed coaxially.

In such a configuration, the rotary electric machine drive gear is disposed on the second axial side of the rotary electric machine, and the distribution differential gear mechanism is disposed on the second axial side of the first distribution output gear and the disconnection engagement device. That is, the rotary electric machine drive gear and the distribution differential gear mechanism are disposed on the same side in the axial direction with respect to the other elements disposed coaxially therewith. Therefore, both the rotary electric machine and the combination of the first distribution output gear and the disconnection engagement device can be disposed in an area on the first axial side of the rotary electric machine drive gear and the distribution differential gear mechanism while the third rotation element of the distribution differential gear mechanism and the rotary electric machine drive gear are drivingly connected appropriately. Accordingly, the dimension of the vehicle drive device in the axial direction can easily be reduced in the configuration including the input member, the output member, the rotary electric machine, the distribution differential gear mechanism, the transmission mechanism, and the disconnection engagement device.

BRIEF DESCRIPTION OF THE DRAWINGS

FIG. 6 is a diagram showing states of engagement devices in each operation mode of the vehicle drive device according to the embodiment.

MODES FOR CARRYING OUT THE DISCLOSURE

Figure 1:
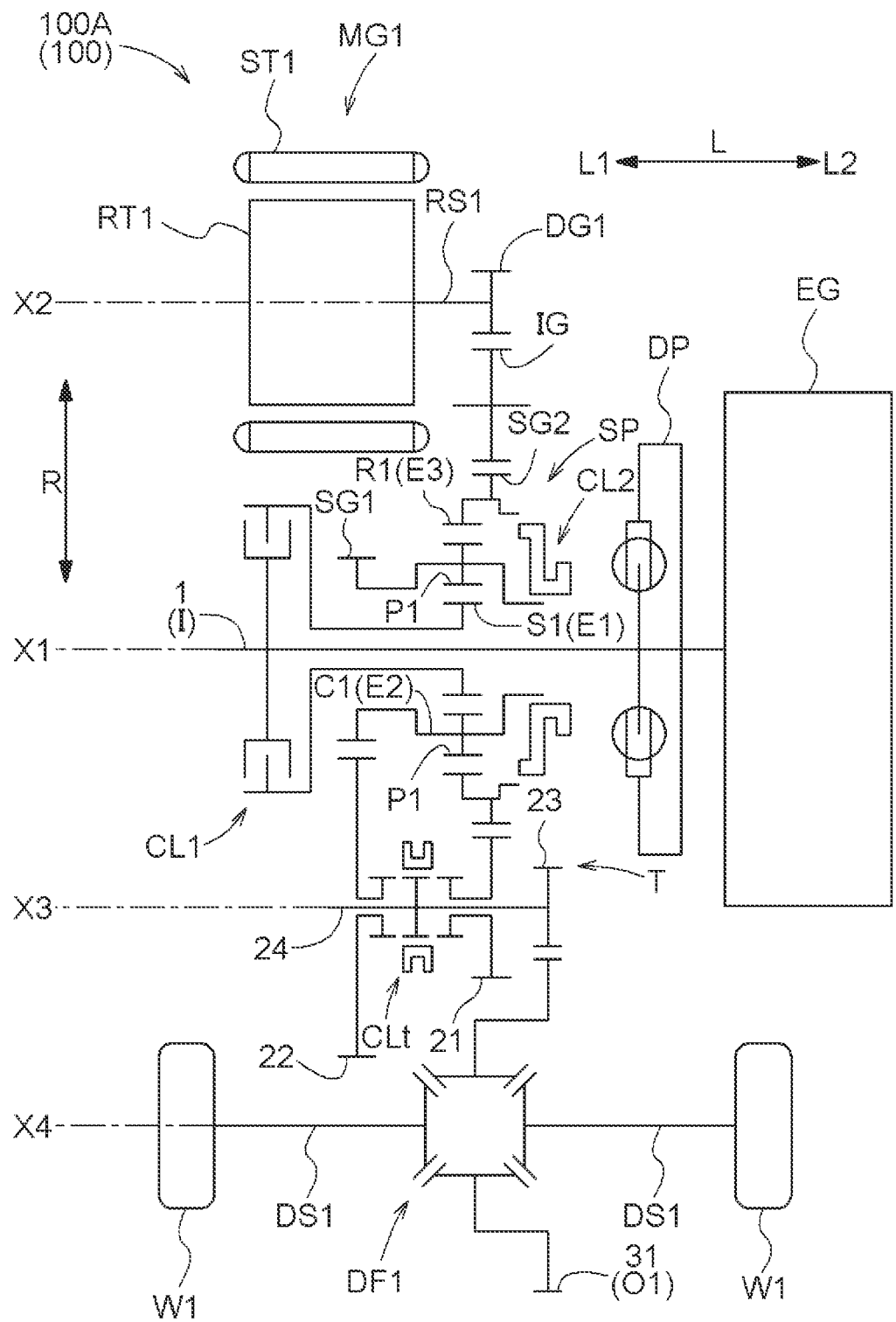
FIG. 1 is a skeleton diagram of a first drive unit of a vehicle drive device according to an embodiment.
Figure 2:
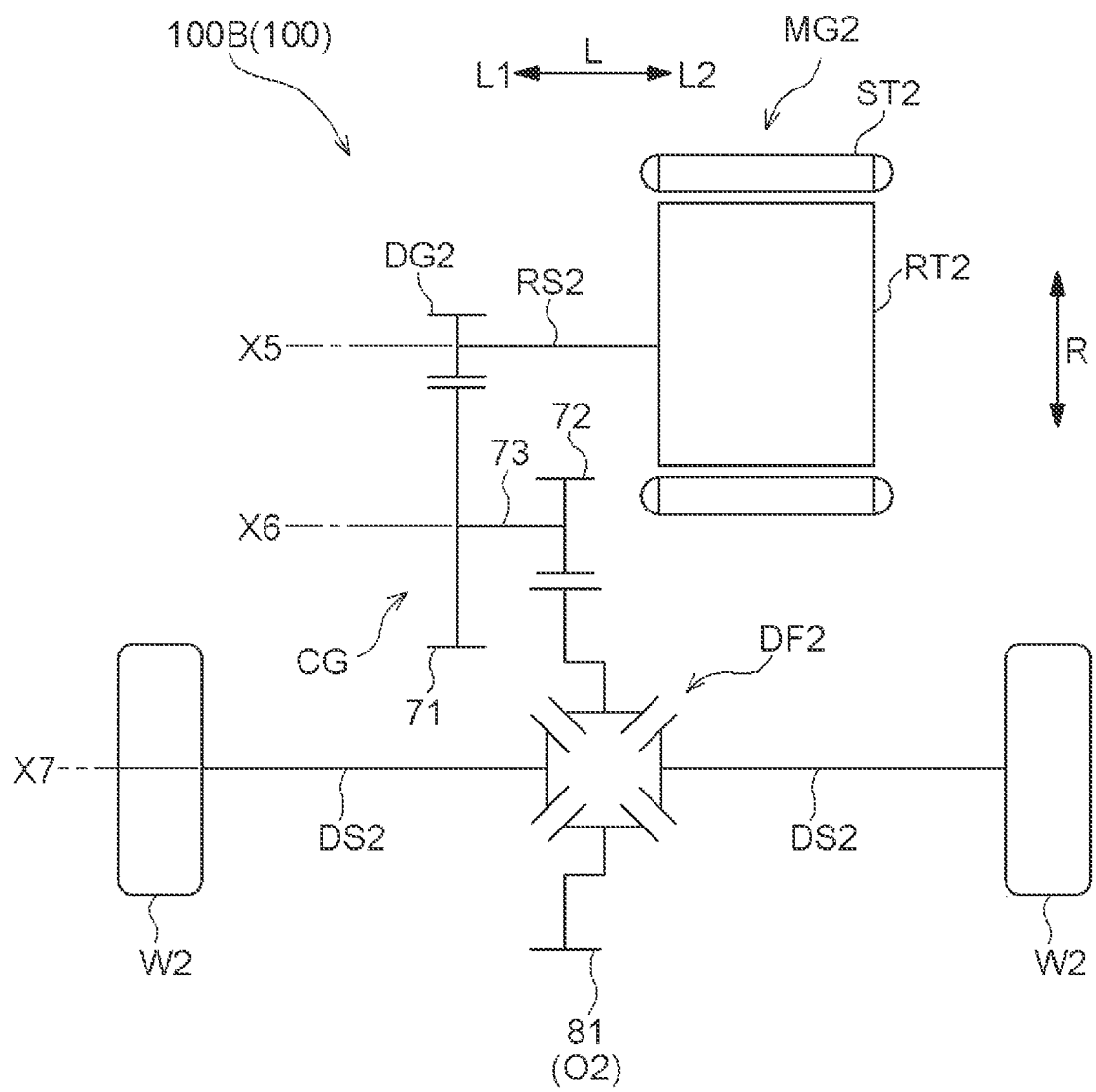
FIG. 2 is a skeleton diagram of a second drive unit of the vehicle drive device according to the embodiment.

Hereinafter, a vehicle drive device 100 according to an embodiment will be described with reference to the drawings. As shown in FIGS. 1 and 2, the vehicle drive device 100 includes a first drive unit 100A that drives first wheels W1, and a second drive unit 100B that drives second wheels W2. In the present embodiment, the first wheels W1 are front wheels of a vehicle, and the second wheels W2 are rear wheels of the vehicle.

As shown in FIG. 1, the first drive unit 100A includes an input member I drivingly connected to an internal combustion engine EG of the vehicle, a first output member O1 drivingly connected to the first wheels W1, a first rotary electric machine MG1, a first rotary electric machine drive gear DG1, a transmission mechanism T including a transmission engagement device CLt, a distribution differential gear mechanism SP, a first distribution output gear SG1, and a first engagement device CL1. In the present embodiment, the first drive unit 100A further includes a second distribution output gear SG2, a first output differential gear mechanism DF1, and a second engagement device CL2.

In the present application, "drivingly connected" refers to a state in which two rotation elements are connected so that a driving force can be transmitted, and includes a state in which the two rotation elements are connected so as to rotate integrally or a state in which the two rotation elements are connected so as to be able to transmit a driving force via one, two, or more transmitting members. Such transmitting members include various members that transmit rotation at the same speed or at a shifted speed, such as a shaft, a gear mechanism, a belt, and a chain. The transmitting members may include an engagement device that selectively transmits rotation and driving force, such as a friction engagement device and an intermeshing engagement device.

The distribution differential gear mechanism SP, the first distribution output gear SG1, and the first engagement device CL1 are disposed on a first axis X1 serving as their rotation axes. In the present embodiment, the input member I, the second distribution output gear SG2, and the second engagement device CL2 are also disposed on the first axis X1. The first rotary electric machine MG1 and the first rotary electric machine drive gear DG1 are disposed on a second axis X2 different from the first axis X1. The transmission engagement device CLt is disposed on a third axis X3 different from the first axis X1 and the second axis X2. In the present embodiment, the first output member O1 and the first output differential gear mechanism DF1 are disposed on a fourth axis X4 different from the first axis X1, the second axis X2, and the third axis X3.

As shown in FIG. 2, in the present embodiment, the second drive unit 100B includes a second output member O2 drivingly connected to the second wheels W2, a second rotary electric machine MG2, a counter gear mechanism CG, and a second output differential gear mechanism DF2. In the present embodiment, the second rotary electric machine MG2 is disposed on a fifth axis X5 serving as its rotation axis. The counter gear mechanism CG is disposed on a sixth axis X6 different from the fifth axis X5. The second output member O2 and the second output differential gear mechanism DF2 are disposed on a seventh axis X7 different from the fifth axis X5 and the sixth axis X6.

In the following description, as shown in FIG. 1, a direction parallel to the rotation axis (second axis X2) of the first rotary electric machine MG1 will be referred to as "axial direction L" of the vehicle drive device 100. The axial direction L includes a "first axial side L1" where the first rotary electric machine MG1 is disposed with respect to the first rotary electric machine drive gear DG1, and a "second axial side L2" opposite to the first axial side L1. A direction orthogonal to the axes X1 to X7 will be referred to as "radial direction R" with respect to each axis. When it is not necessary to distinguish the axis to be used as a reference, or when the axis to be used as a reference is clear, the direction may be simply referred to as "radial direction R". In this example, the axes X1 to X7 are parallel to each other.

Figure 3:
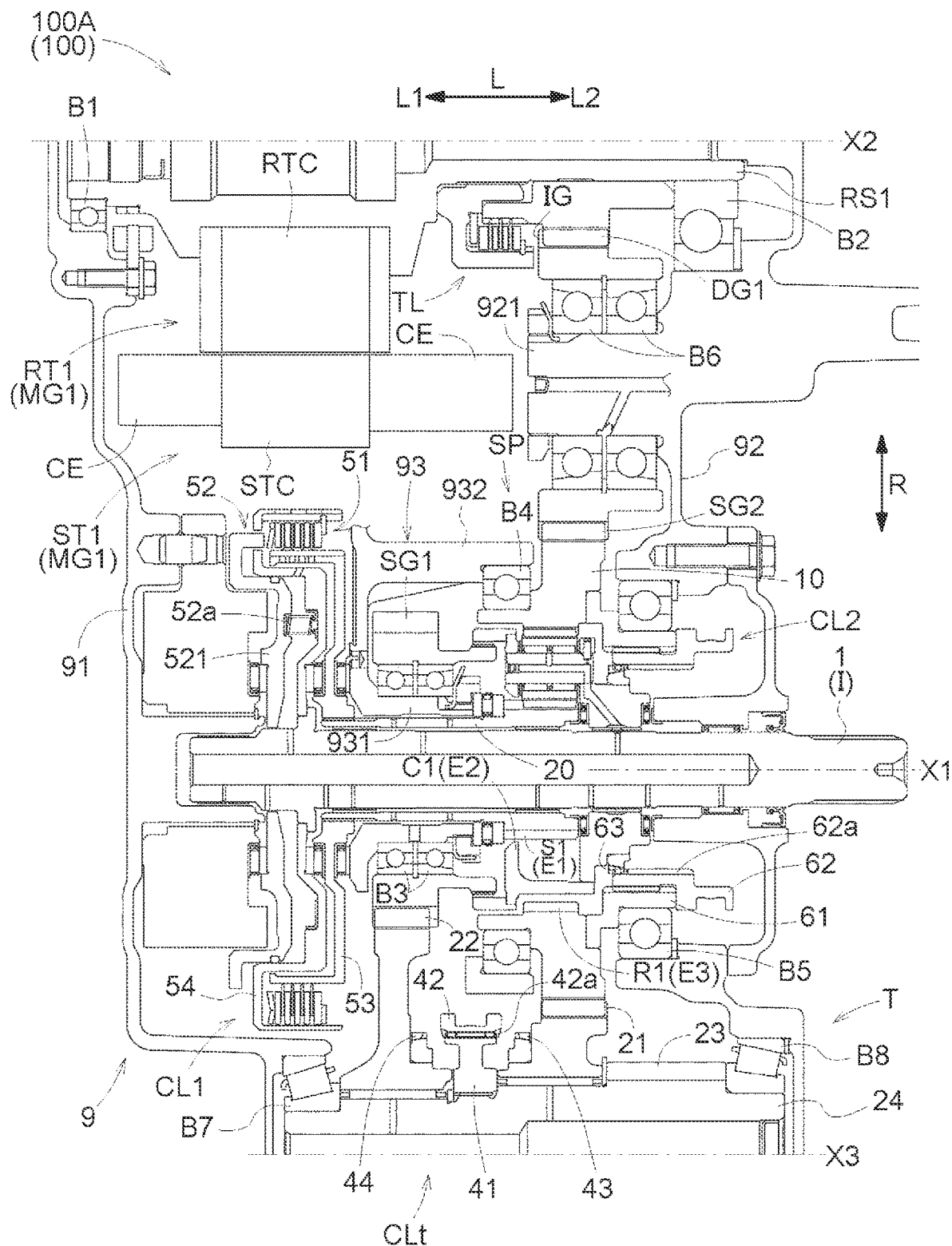
FIG. 3 is a sectional view of the first drive unit of the vehicle drive device according to the embodiment that is taken along an axial direction.
Figure 4:
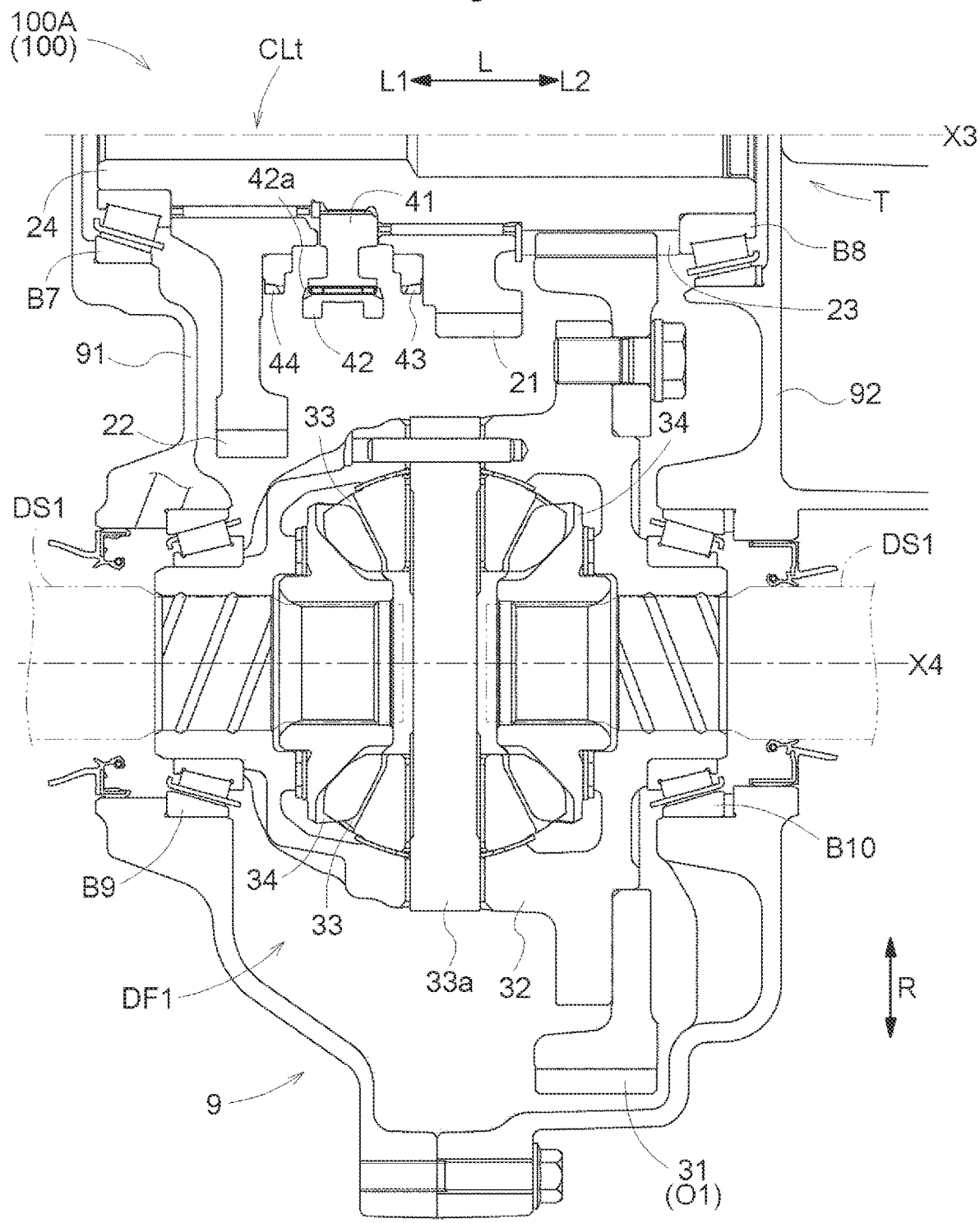
FIG. 4 is a sectional view of the first drive unit of the vehicle drive device according to the embodiment that is taken along the axial direction.

As shown in FIGS. 3 and 4, in the present embodiment, a part of the input member I, the distribution differential gear mechanism SP, the first distribution output gear SG1, the second distribution output gear SG2, the first engagement device CL1, the second engagement device CL2, the first rotary electric machine MG1, the first rotary electric machine drive gear DG1, the transmission mechanism T, the first output differential gear mechanism DF1, and the first output member O1 are housed in a case 9.

In the present embodiment, the case 9 includes a first side wall portion 91 and a second side wall portion 92 disposed on the second axial side L2 of the first side wall portion 91. The first side wall portion 91 and the second side wall portion 92 are formed so as to extend along the radial direction R. A housing space for housing the components of the vehicle drive device 100 is formed between the first side wall portion 91 and the second side wall portion 92 in the axial direction L.

As shown in FIG. 3, in the present embodiment, the input member I is an input shaft 1 extending along the axial direction L. In the present embodiment, the input shaft 1 is disposed so as to pass through the distribution differential gear mechanism SP, the first distribution output gear SG1, the second distribution output gear SG2, the first engagement device CL1, and the second engagement device CL2 in the axial direction L. The input shaft 1 is disposed so as to pass through the second side wall portion 92 in the axial direction L. As shown in FIG. 1, the input shaft 1 is drivingly connected to an output shaft ES of the internal combustion engine EG via a damper device DP that damps fluctuation in transmitted torque. The internal combustion engine EG is a prime mover (gasoline engine, diesel engine, or the like) that is driven by combustion of fuel to take out driving force. The internal combustion engine EG functions as a driving force source for the first wheels W1.

The first rotary electric machine MG1 functions as a driving force source for the first wheels W1. The first rotary electric machine MG1 has a function as a motor (electric motor) that receives supply of electric power to generate driving force, and a function as a generator (electric power generator) that receives supply of driving force to generate electric power. Specifically, the first rotary electric machine MG1 is electrically connected to a power storage device such as a battery or a capacitor so as to exchange electric power with the power storage device. The first rotary electric machine MG1 generates a driving force by power running with electric power stored in the power storage device. The first rotary electric machine MG1 generates electric power with a driving force of the internal combustion engine EG or a driving force transmitted from the first output member O1 side to charge the power storage device.

As shown in FIG. 3, the first rotary electric machine MG1 includes a first stator ST1 and a first rotor RT1 supported so as to be rotatable relative to the first stator ST1. In the present embodiment, the first rotor RT1 is disposed on an inner side in the radial direction R with respect to the first stator ST1.

The first stator ST1 includes a stator core STC and coil end portions CE. The stator core STC is fixed to a non-rotating member (in this case, the case 9). The coil end portion CE is a coil portion protruding in the axial direction L from the stator core STC. Specifically, a coil is wound around the stator core STC so as to protrude from the stator core STC to both sides in the axial direction L (first axial side L1 and second axial side L2). Portions of the coil that protrude from the stator core STC to the first axial side L1 and the second axial side L2 correspond to the coil end portions CE.

The first rotor RT1 includes a rotor core RTC supported so as to be rotatable relative to the first stator core STC1. Although illustration is omitted, permanent magnets are disposed in the rotor core RTC.

In the present embodiment, a first rotor shaft RS1 extending along the axial direction L is connected to the first rotor RT1 so as to rotate integrally with the first rotor RT1. The first rotor shaft RS1 is rotatably supported by a first bearing B1 and a second bearing B2. In the present embodiment, the first rotor shaft RS1 is disposed so as to protrude from the rotor core RTC to the first axial side L1 and the second axial side L2. A portion of the first rotor shaft RS1 that protrudes from the rotor core RTC to the first axial side L1 is rotatably supported by the first side wall portion 91 of the case 9 via the first bearing B1. A portion of the first rotor shaft RS1 that protrudes from the rotor core RTC to the second axial side L2 is rotatably supported by the second side wall portion 92 of the case 9 via the second bearing B2.

In the present embodiment, the first rotary electric machine drive gear DG1 is connected to the first rotor shaft RS1 so as to rotate integrally with the first rotor shaft RS1. In this example, the first rotary electric machine drive gear DG1 is connected to the first rotor shaft RS1 via a torque limiter TL. Therefore, in a normal state in which a torque equal to or smaller than a permissible transmission torque of the torque limiter TL acts on the first rotary electric machine drive gear DG1, the first rotary electric machine drive gear DG1 and the first rotor shaft RS1 are connected by the torque limiter TL. When a torque exceeding the permissible transmission torque of the torque limiter TL acts on the first rotary electric machine drive gear DG1, the connection between the first rotary electric machine drive gear DG1 and the first rotor shaft RS1 by the torque limiter TL is terminated. The first rotary electric machine drive gear DG1 rotates relative to the first rotor shaft RS1, thereby limiting torque transmission between the first rotary electric machine drive gear DG1 and the first rotor shaft RS1. In the example shown in FIG. 3, the torque limiter TL has a multi-plate frictional configuration including a plurality of plate members arranged in the axial direction L.

The distribution differential gear mechanism SP includes a first rotation element E1 drivingly connected to the input member I, a second rotation element E2 drivingly connected to the transmission mechanism T, and a third rotation element E3 drivingly connected to the first rotary electric machine drive gear DG1.

In the present embodiment, the distribution differential gear mechanism SP is a planetary gear mechanism including a sun gear S1, a carrier C1, and a ring gear R1. In this example, the distribution differential gear mechanism SP is a single-pinion planetary gear mechanism including the carrier C1 that supports pinion gears P1, the sun gear S1 that meshes with the pinion gears P1, and the ring gear R1 that is disposed on an outer side in the radial direction R with respect to the sun gear S1 and meshes with the pinion gears P1.

In the present embodiment, the first rotation element E1 is the sun gear S1. The second rotation element E2 is the carrier C1. The third rotation element E3 is the ring gear R1. Therefore, the order of rotation speeds of the rotation elements of the distribution differential gear mechanism SP according to the present embodiment is the order of the first rotation element E1, the second rotation element E2, and the third rotation element E3. The "order of rotation speeds" means the order of rotation speeds of the rotation elements in a rotating state. The rotation speeds of the rotation elements change depending on the rotating state of the planetary gear mechanism, but the order of the rotation speeds of the rotation elements is constant because it is determined by the structure of the planetary gear mechanism.

The first distribution output gear SG1 is connected to the second rotation element E2 so as to rotate integrally with the second rotation element E2. In the present embodiment, the first distribution output gear SG1 is disposed on the first axial side L1 of the carrier C1 serving as the second rotation element E2.

The second distribution output gear SG2 is connected to the third rotation element E3 so as to rotate integrally with the third rotation element E3. In the present embodiment, the second distribution output gear SG2 is formed on the outer peripheral surface of a tubular gear forming member 2 with its axis on the first axis X1. The ring gear R1 serving as the third rotation element E3 is formed on the inner peripheral surface of the gear forming member 2.

In the present embodiment, the second distribution output gear SG2 is disposed on the outer side in the radial direction R with respect to the ring gear R1. The second distribution output gear SG2 is disposed so as to overlap the ring gear R1 in a radial view along the radial direction R. Regarding the disposition of two elements, the phrase "overlap when viewed in a specific direction" means that, when a virtual straight line parallel to the line-of-sight direction is moved in directions orthogonal to the virtual straight line, an area where the virtual straight line intersects both the two elements is present at least in part.

In the present embodiment, the second distribution output gear SG2 is drivingly connected to the first rotary electric machine drive gear DG1 via an idler gear IG. That is, the second distribution output gear SG2 and the first rotary electric machine drive gear DG1 mesh with the idler gear IG at different positions in a circumferential direction. The idler gear IG is disposed on an axis different from the first axis X1 to the seventh axis X7. In the present embodiment, the idler gear IG is rotatably supported, via a sixth bearing B6, by a protrusion 921 formed so as to protrude from the second side wall portion 92 of the case 9 to the first axial side L1. In the present embodiment, the sixth bearing B6 is supported by the protrusion 921 from the inner side in the radial direction R. The sixth bearing B6 rotatably supports the idler gear IG from the inner side in the radial direction R. In the example shown in FIG. 3, a pair of sixth bearings B6 is disposed to adjoin each other in the axial direction L.

In the present embodiment, the first distribution output gear SG1 and the gear forming member 2 on which the second distribution output gear SG2 is formed are rotatably supported by a support wall portion 93 of the case 9. In the present embodiment, the support wall portion 93 includes a first tubular portion 931 having a tubular shape and disposed on the inner side in the radial direction R with respect to the first distribution output gear SG1, and a second tubular portion 932 having a tubular shape and disposed on the outer side in the radial direction R with respect to the first distribution output gear SG1. The first distribution output gear SG1 is rotatably supported by the first tubular portion 931 via a third bearing B3. The gear forming member 2 is rotatably supported by the first tubular portion 931 via a fourth bearing B4.

In the present embodiment, the third bearing B3 is supported by the first tubular portion 931 from the inner side in the radial direction R. The third bearing B3 rotatably supports the first distribution output gear SG1 from the inner side in the radial direction R. In the example shown in FIG. 3, a pair of third bearings B3 is disposed to adjoin each other in the axial direction L. In the present embodiment, the fourth bearing B4 is supported by the second tubular portion 932 from the outer side in the radial direction R. The fourth bearing B4 rotatably supports the gear forming member 2 from the outer side in the radial direction R.

The transmission mechanism T transmits the rotation transmitted from the distribution differential gear mechanism SP to the first output member O1. In the present embodiment, the transmission mechanism T includes a first gear 21, a second gear 22, a transmission output gear 23, and a transmission shaft 24. The first gear 21, the second gear 22, the transmission output gear 23, and the transmission shaft 24 are disposed on the third axis X3.

The first gear 21 meshes with the second distribution output gear SG2. The second gear 22 meshes with the first distribution output gear SG1. In the present embodiment, each of the first gear 21 and the second gear 22 is supported via a bearing so as to be rotatable relative to the transmission shaft 24.

The transmission output gear 23 meshes with a first differential input gear 31 of the first output differential gear mechanism DF1 (see FIGS. 1 and 4). In the present embodiment, the first differential input gear 31 corresponds to the first output member O1.

In the present embodiment, the transmission output gear 23 is connected to the transmission shaft 24 so as to rotate integrally with the transmission shaft 24. In the example shown in FIG. 3, the transmission output gear 23 is formed integrally with the transmission shaft 24. In the present embodiment, the transmission output gear 23 is disposed on the second axial side L2 of the first gear 21 and the second gear 22.

The transmission shaft 24 is formed so as to extend along the axial direction L. In the present embodiment, the transmission shaft 24 is rotatably supported by a seventh bearing B7 and an eighth bearing B8. In the present embodiment, the seventh bearing B7 is supported by the first side wall portion 91 of the case 9 from the outer side in the radial direction R. The seventh bearing B7 rotatably supports the end of the transmission shaft 24 on the first axial side L1 from the outer side in the radial direction R. In the present embodiment, the eighth bearing B8 is supported by the second side wall portion 92 of the case 9 from the outer side in the radial direction R. The eighth bearing B8 rotatably supports the end of the transmission shaft 24 on the second axial side L2 from the outer side in the radial direction R.

As shown in FIG. 4, the first output differential gear mechanism DF1 distributes the rotation of the first differential input gear 31 serving as the first output member O1 to the pair of first wheels W1. In the present embodiment, the first output differential gear mechanism DF1 further includes, in addition to the first differential input gear 31, a first differential case 32, a pair of first pinion gears 33, and a pair of first side gears 34. Both the pair of first pinion gears 33 and the pair of first side gears 34 are bevel gears.

The first differential case 32 is connected to the first differential input gear 31 so as to rotate integrally with the first differential input gear 31. In the present embodiment, the first differential case 32 is rotatably supported by a ninth bearing B9 and a tenth bearing B10. In the present embodiment, the ninth bearing B9 is supported by the first side wall portion 91 of the case 9 from the outer side in the radial direction R. The ninth bearing B9 rotatably supports the end of the first differential case 32 on the first axial side L1 from the outer side in the radial direction R. In the present embodiment, the tenth bearing B10 is supported by the second side wall portion 92 of the case 9 from the outer side in the radial direction R. The tenth bearing B10 rotatably supports the end of the first differential case 32 on the second axial side L2 from the outer side in the radial direction R.

The first differential case 32 is a hollow member. The first differential case 32 houses the pair of first pinion gears 33 and the pair of first side gears 34.

The pair of first pinion gears 33 is disposed so as to face each other with a distance along the radial direction R with respect to the fourth axis X4. The pair of first pinion gears 33 is attached to a first pinion shaft 33a supported so as to rotate integrally with the first differential case 32. The pair of first pinion gears 33 is rotatable (spinnable) about the first pinion shaft 33a and rotatable (revolvable) about the fourth axis X4.

The pair of first side gears 34 is output elements of the first output differential gear mechanism DF1. The pair of first side gears 34 is disposed so as to face each other across the first pinion shaft 33a with a distance in the axial direction L. The pair of first side gears 34 meshes with the pair of first pinion gears 33. First drive shafts DS1 drivingly connected to the first wheels W1 are connected to the pair of first side gears 34 so as to rotate integrally with the pair of first side gears 34.

In the present embodiment, the disposition area of the first output differential gear mechanism DF1 in the axial direction L overlaps the disposition areas of the first gear 21, the second gear 22, and the transmission engagement device CLt in the axial direction L. In the example shown in FIG. 4, the disposition areas of the first gear 21, the second gear 22, and the transmission engagement device CLt in the axial direction L are within the disposition area of the first output differential gear mechanism DF1 in the axial direction L. Specifically, the end on the first axial side L1 for the second gear 22 positioned closest to the first axial side L1 among the first gear 21, the second gear 22, and the transmission engagement device CLt is positioned on the second axial side L2 of the end on the first axial side L1 for the first differential case 32 of the first output differential gear mechanism DF1. The end on the second axial side L2 for the first gear 21 positioned closest to the second axial side L2 among the first gear 21, the second gear 22, and the transmission engagement device CLt is positioned on the first axial side L1 of the end on the second axial side L2 for the first differential case 32 of the first output differential gear mechanism DF1.

According to this configuration, the dimension of the vehicle drive device 100 in the axial direction L can be reduced compared to a configuration in which the disposition area of the first output differential gear mechanism DF1 in the axial direction L does not overlap the disposition area of at least one of the first gear 21, the second gear 22, and the transmission engagement device CLt in the axial direction L.

As shown in FIG. 3, the transmission engagement device CLt of the transmission mechanism T is an engagement device that switches the state of power transmission. In the present embodiment, the transmission engagement device CLt is an intermeshing engagement device (dog clutch) that selectively connects the first gear 21 or the second gear 22 to the transmission shaft 24.

As described above, the first gear 21 and the second gear 22 are disposed coaxially, and the first distribution output gear SG1 and the second distribution output gear SG2 are disposed coaxially. In the present embodiment, the first gear 21 is formed to have a smaller diameter than the second gear 22. The second distribution output gear SG2 that meshes with the first gear 21 is formed to have a larger diameter than the first distribution output gear SG1 that meshes with the second gear 22. Therefore, in the present embodiment, the gear ratio of the second gear 22 to the first distribution output gear SG1 is larger than the gear ratio of the first gear 21 to the second distribution output gear SG2.

In such a configuration, when the transmission engagement device CLt connects the second gear 22 to the transmission shaft 24, a low speed that is a shift speed having a relatively large speed ratio is formed. When the transmission engagement device CLt connects the first gear 21 to the transmission shaft 24, a high speed that is a shift speed having a relatively small speed ratio is formed. In the present embodiment, the transmission engagement device CLt is switchable to a neutral state in which neither of the shift speeds is formed. When the transmission engagement device CLt is in the neutral state, the transmission mechanism T does not transmit the rotation between the distribution differential gear mechanism SP and the first output member O1.

Thus, in the present embodiment, the transmission mechanism T is structured as a parallel-shaft gear transmission including the second distribution output gear SG2 and the first gear 21 that mesh with each other, and the first distribution output gear SG1 and the second gear 22 that mesh with each other.

In the present embodiment, the transmission engagement device CLt is disposed between the first gear 21 and the second gear 22 in the axial direction L. The transmission engagement device CLt includes a support member 41, a switching member 42, a first engaged portion 43, and a second engaged portion 44.

The support member 41 is formed so as to protrude outward in the radial direction R from the transmission shaft 24. The support member 41 is connected to the transmission shaft 24 so as to rotate integrally with the transmission shaft 24. In the example shown in FIG. 3, the support member 41 is connected to the transmission shaft 24 by spline engagement.

The switching member 42 is formed in a tubular shape covering an outer side of the support member 41 in the radial direction R. An engaging portion 42*a* having a plurality of internal teeth is formed on the inner peripheral portion of the switching member 42, and a plurality of external teeth mating with the internal teeth is formed on the outer peripheral portion of the support member 41. These internal and external teeth are engaged so as to be relatively movable in the axial direction L and not to be relatively rotatable in the circumferential direction. Thus, the switching member 42 is supported so as to rotate integrally with the support member 41 and to move relative to the support member 41 in the axial direction L. That is, the switching member 42 is a sleeve of the intermeshing engagement device (dog clutch).

The first engaged portion 43 is connected to the first gear 21 so as to rotate integrally with the first gear 21. The first engaged portion 43 is disposed on the second axial side L2 of the support member 41. The first engaged portion 43 is formed in a tubular shape with its axis on the third axis X3. A plurality of external teeth engageable with the plurality of internal teeth of the engaging portion 42*a* of the switching member 42 so as to be relatively movable in the axial direction L and not to be relatively rotatable in the circumferential direction is formed on the outer peripheral portion of the first engaged portion 43.

The second engaged portion 44 is connected to the second gear 22 so as to rotate integrally with the second gear 22. The second engaged portion 44 is disposed on the first axial side L1 of the support member 41. The second engaged portion 44 is formed in a tubular shape with its axis on the third axis X3. A plurality of external teeth engageable with the plurality of internal teeth of the engaging portion 42*a* of the switching member 42 so as to be relatively movable in the axial direction L and not to be relatively rotatable in the circumferential direction is formed on the outer peripheral portion of the second engaged portion 44.

When the switching member 42 moves to the first axial side L1 relative to the support member 41 and the internal teeth of the engaging portion 42*a* and the external teeth of the second engaged portion 44 are engaged with each other, the second gear 22 is connected to the transmission shaft 24, that is, the low speed described above is formed. When the switching member 42 moves to the second axial side L2 relative to the support member 41 and the internal teeth of the engaging portion 42*a* and the external teeth of the first engaged portion 43 are engaged with each other, the first gear 21 is connected to the transmission shaft 24, that is, the high speed described above is formed. When the internal teeth of the engaging portion 42*a* are engaged with neither the external teeth of the first engaged portion 43 nor the external teeth of the second engaged portion 44, neither the first gear 21 nor the second gear 22 is connected to the transmission shaft 24, that is, the neutral state described above is achieved.

The first engagement device CL1 is a "disconnection engagement device" that connects or disconnects power transmission between the input member I and the first rotation element E1 of the distribution differential gear mechanism SP. In the present embodiment, the first engagement device CL1 is disposed on the first axial side L1 of the first distribution output gear SG1. In the present embodiment, the first distribution output gear SG1 is disposed on the first axial side L1 of the distribution differential gear mechanism SP. Thus, the distribution differential gear mechanism SP is disposed on the second axial side L2 of the first distribution output gear SG1 and the first engagement device CL1.

In the present embodiment, the first engagement device CL1 includes a friction member 51 and a piston 52 that presses the friction member 51.

The friction member 51 includes a plurality of inner friction members supported by a first support member 53 from the inner side in the radial direction R, and a plurality of outer friction members supported by a second support member 54 from the outer side in the radial direction R. The inner friction members and the outer friction members are disposed alternately in the axial direction L.

In the present embodiment, the first support member 53 is connected to the sun gear S1 of the distribution differential gear mechanism SP so as to rotate integrally with the sun gear S1. In the example shown in FIG. 3, the first support member 53 is connected to the sun gear S1 via a tubular connecting member 20 disposed between the first tubular portion 931 of the support wall portion 93 of the case 9 and the input shaft 1 in the radial direction R so as to pass through the first tubular portion 931 in the axial direction L. The first support member 53 is formed so as to extend outward in the radial direction R from the connecting member 20 and further extend to the first axial side L1. A portion of the first support member 53 that extends to the first axial side L1 supports the inner friction members of the friction member 51 from the inner side in the radial direction R.

In the present embodiment, the second support member 54 is connected to the input shaft 1 so as to rotate integrally with the input shaft 1. In the example shown in FIG. 3, the second support member 54 is formed so as to extend outward in the radial direction R from a portion of the input shaft 1 on the first axial side L1 of the connection portion between the first support member 53 and the connecting member 20, further extend to the first axial side L1, further extend outward in the radial direction R, and further extend to the second axial side L2. A portion of the second support member 54 that extends to the second axial side L2 supports the outer friction members of the friction member 51 from the outer side in the radial direction R.

The piston 52 is urged to the first axial side L1 by an urging member 52a such as a spring. When the piston 52 is pressed from the first axial side L1 against an urging force of the urging member 52a, the piston 52 slides to the second axial side L2 and presses the friction member 51.

In the present embodiment, the piston 52 is disposed so as to overlap the friction member 51 in the radial view along the radial direction R. In the example shown in FIG. 3, the piston 52 includes a sliding portion 521 that slides in the axial direction L in a cylinder portion formed by the input shaft 1, a portion of the second support member 54 that extends outward in the radial direction R from the input shaft 1, and a portion that extends to the first axial side L1 from the end of that portion on the outer side in the radial direction R. The sliding portion 521 overlaps the friction member 51 in the radial view along the radial direction R.

According to this configuration, the dimension of the vehicle drive device 100 in the axial direction L can be reduced compared to a configuration in which the piston 52 does not overlap the friction member 51 in the radial view.

The second engagement device CL2 connects or disconnects power transmission between two elements selected from among the three rotation elements that are the first rotation element E1, the second rotation element E2, and the third rotation element E3 of the distribution differential gear mechanism SP. In the present embodiment, the second engagement device CL2 connects or disconnects power transmission between the carrier C1 serving as the second rotation element E2 and the ring gear R1 serving as the third rotation element E3. In the present embodiment, the second engagement device CL2 is an intermeshing engagement device (dog clutch) including a support member 61, a switching member 62, and an engaged portion 63. In the present embodiment, the disposition area of the second engagement device CL2 in the axial direction L overlaps the disposition area of the transmission output gear 23 in the axial direction L.

The support member 61 is connected to the ring gear R1 so as to rotate integrally with the ring gear R1. In the present embodiment, the support member 61 is formed in a tubular shape protruding from a gear forming member 10 to the second axial side L2. In the present embodiment, the support member 61 is rotatably supported by a fifth bearing B5. In the present embodiment, the fifth bearing B5 is supported by the second side wall portion 92 of the case 9 from the outer side in the radial direction R. The fifth bearing B5 rotatably supports the support member 61 from the outer side in the radial direction R.

The switching member 62 is supported so as to rotate integrally with the support member 61 and to move relative to the support member 61 in the axial direction L. In the present embodiment, the switching member 62 is formed in a tubular shape covering an inner side of the support member 61 in the radial direction R. A plurality of external teeth is formed on the outer peripheral portion of the switching member 62, and a plurality of internal teeth mating with the external teeth is formed on the inner peripheral portion of the support member 61. These internal and external teeth are engaged so as to be relatively movable in the axial direction L and not to be relatively rotatable in the circumferential direction. Thus, the switching member 62 is a sleeve of the intermeshing engagement device (dog clutch).

In the present embodiment, an engaging portion 62a having a plurality of internal teeth is formed on the inner peripheral portion of the switching member 62.

The engaged portion 63 is connected to the carrier C1 so as to rotate integrally with the carrier C1. In the present embodiment, the engaged portion 63 is formed in a tubular shape with its axis on the first axis X1. A plurality of external teeth engageable with the plurality of internal teeth of the engaging portion 62a of the switching member 62 so as to be relatively movable in the axial direction L and not to be relatively rotatable in the circumferential direction is formed on the outer peripheral portion of the engaged portion 63.

When the switching member 62 moves in the axial direction L relative to the support member 61 and the internal teeth of the engaging portion 62a are engaged with the external teeth of the engaged portion 63, the carrier C1 and the ring gear R1 are connected to each other. As a result, the three rotation elements E1 to E3 of the distribution differential gear mechanism SP rotate integrally with each other. When the internal teeth of the engaging portion 62a are not engaged with the external teeth of the engaged portion 63, the carrier C1 and the ring gear R1 are disconnected. As a result, the three rotation elements E1 to E3 of the distribution differential gear mechanism SP rotate relatively.

As described above, the vehicle drive device 100 (in this case, the first drive unit 100A) includes:

the input member I drivingly connected to the internal combustion engine EG;

the first output member O1 drivingly connected to the first wheels W1;

the first rotary electric machine MG1 including the first rotor RT1;

the first rotary electric machine drive gear DG1 drivingly connected to the first rotor RT1;

the transmission mechanism T including the transmission engagement device CLt configured to switch the state of power transmission;

the distribution differential gear mechanism SP including the first rotation element E1 drivingly connected to the input member I, the second rotation element E2 drivingly connected to the transmission mechanism T, and the third rotation element E3 drivingly connected to the first rotary electric machine drive gear DG1;

the first distribution output gear SG1 connected to the second rotation element E2 so as to rotate integrally with the second rotation element E2; and the first engagement device CL1 configured to connect or disconnect the power transmission between the input member I and the first rotation element E1.

The transmission mechanism T is configured to transmit the rotation transmitted from the distribution differential gear mechanism SP to the first output member O1.

The distribution differential gear mechanism SP, the first distribution output gear SG1, and the first engagement device CL1 are disposed on the first axis X1.

The first rotary electric machine MG1 and the first rotary electric machine drive gear DG1 are disposed on the second axis X2 different from the first axis X1.

The transmission engagement device CLt is disposed on the third axis X3 different from the first axis X1 and the second axis X2.

The axial direction L of the first rotary electric machine MG1 includes the first axial side L1 where the first rotary electric machine MG1 is disposed with respect to the first rotary electric machine drive gear DG1, and the second axial side L2 opposite to the first axial side L1.

The distribution differential gear mechanism SP is disposed on the second axial side L2 of the first distribution output gear SG1 and the first engagement device CL1.

According to this configuration, the combination of the distribution differential gear mechanism SP, the first distribution output gear SG1, and the first engagement device CL1, the combination of the first rotary electric machine MG1 and the first rotary electric machine drive gear DG1, and the transmission engagement device CLt are disposed on different axes. Thus, the dimension of the vehicle drive device 100 in the axial direction L can easily be reduced compared to a configuration in which some or all of them are disposed coaxially.

In such a configuration, the first rotary electric machine drive gear DG1 is disposed on the second axial side L2 of the first rotary electric machine MG1, and the distribution differential gear mechanism SP is disposed on the second axial side L2 of the first distribution output gear SG1 and the first engagement device CL1. That is, the first rotary electric machine drive gear DG1 and the distribution differential gear mechanism SP are disposed on the same side in the axial direction L with respect to the other elements disposed coaxially therewith. Therefore, both the first rotary electric machine MG1 and the combination of the first distribution output gear SG1 and the first engagement device CL1 can be disposed in an area on the first axial side L1 of the first rotary electric machine drive gear DG1 and the distribution differential gear mechanism SP while the third rotation element E3 of the distribution differential gear mechanism SP and the first rotary electric machine drive gear DG1 are drivingly connected appropriately. Accordingly, the dimension of the vehicle drive device 100 in the axial direction L can easily be reduced in the configuration including the input member I, the first output member O1, the first rotary electric machine MG1, the distribution differential gear mechanism SP, the transmission mechanism T, and the first engagement device CL1.

In the present embodiment, both the disposition area of the first distribution output gear SG1 in the axial direction L and the disposition area of the first engagement device CL1 in the axial direction L overlap the disposition area of the first rotary electric machine MG1 in the axial direction L. In the example shown in FIG. 3, the disposition areas of the first distribution output gear SG1 and the first engagement device CL1 in the axial direction L are within the disposition area of the first rotary electric machine MG1 in the axial direction L. Specifically, the end on the first axial side L1 for the first engagement device CL1 positioned on the first axial side L1 of the first distribution output gear SG1 is positioned on the second axial side L2 of the end on the first axial side L1 for the coil end portion CE of the first rotary electric machine MG1 on the first axial side L1. The end on the second axial side L2 for the first distribution output gear SG1 is positioned on the first axial side L1 of the end on the second axial side L2 for the coil end portion CE of the first rotary electric machine MG1 on the second axial side L2.

According to this configuration, the dimension of the vehicle drive device 100 in the axial direction L can be reduced compared to a configuration in which the disposition area of at least one of the first distribution output gear SG1 and the first engagement device CL1 in the axial direction L does not overlap the disposition area of the first rotary electric machine MG1 in the axial direction L.

In the present embodiment, the vehicle drive device 100 (in this case, the first drive unit 100A) further includes the second distribution output gear SG2 connected to the third rotation element E3 so as to rotate integrally with the third rotation element E3.

The distribution differential gear mechanism SP is the planetary gear mechanism including the sun gear S1, the carrier C1, and the ring gear R1.

The third rotation element E3 is the ring gear R1.

The second distribution output gear SG2 is disposed on the first axis X1 and on the outer side in the radial direction R with respect to the ring gear R1.

The transmission mechanism T includes the first gear 21 disposed on the third axis X3 and meshing with the second distribution output gear SG2.

The ring gear R1 and the second distribution output gear SG2 overlap each other in the radial view along the radial direction R.

According to this configuration, the dimension of the vehicle drive device 100 in the axial direction L can be reduced compared to a configuration in which the ring gear R1 and the second distribution output gear SG2 do not overlap each other in the radial view along the radial direction R.

According to this configuration, the second distribution output gear SG2 connected to the ring gear R1 serving as the third rotation element E3 drivingly connected to the first rotary electric machine drive gear DG1 so as to rotate integrally with the ring gear R1 is disposed on the outer side in the radial direction R with respect to the ring gear R1. Therefore, the second distribution output gear SG2 and the first rotary electric machine drive gear DG1 can easily mesh with each other directly or indirectly. Thus, the first rotary electric machine drive gear DG1 and the third rotation element E3 can be drivingly connected appropriately.

In the present embodiment, the vehicle drive device 100 (in this case, the first drive unit 100A) further includes the first output differential gear mechanism DF1 including the first differential input gear 31 serving as the first output member O1 and configured to distribute the rotation of the first differential input gear 31 to the pair of first wheels W1.

The transmission mechanism T further includes the second gear 22 disposed on the third axis X3 and meshing with the first distribution output gear SG1, and the transmission output gear 23 disposed on the third axis X3 and meshing with the first differential input gear 31.

On the third axis X3, the transmission output gear 23, the first gear 21, the transmission engagement device CLt, and the second gear 22 are disposed in this order from the second axial side L2.

According to this configuration, the transmission mechanism T can be structured as the parallel-shaft gear transmission including the second distribution output gear SG2 and the first gear 21 that mesh with each other, and the first distribution output gear SG1 and the second gear 22 that mesh with each other. In addition, the rotation shifted by the transmission can be transmitted to the pair of first wheels W1 via the first output differential gear mechanism DF1.

According to this configuration, the transmission engagement device CLt is disposed between the first gear 21 and the second gear 22 in the axial direction L. Thus, the transmission engagement device CLt can easily switch the states of power transmission of the first gear 21 and the second gear 22.

As shown in FIG. 2, the second rotary electric machine MG2 functions as a driving force source for the second wheels W2. The second rotary electric machine MG2 has a function as a motor (electric motor) that receives supply of electric power to generate driving force, and a function as a generator (electric power generator) that receives supply of driving force to generate electric power. Specifically, the second rotary electric machine MG2 is electrically connected to the power storage device so as to exchange electric power with the power storage device. The second rotary electric machine MG2 generates a driving force by power running with electric power stored in the power storage device. During regeneration, the second rotary electric machine MG2 generates electric power with a driving force transmitted from the second output member O2 side to charge the power storage device.

The second rotary electric machine MG2 includes a second stator ST2 and a second rotor RT2. The second stator ST2 is fixed to a non-rotating member (for example, a case that houses the second rotary electric machine MG2 and the like). The second rotor RT2 is supported so as to be rotatable relative to the second stator ST2. In the present embodiment, the second rotor RT2 is disposed on the inner side in the radial direction R with respect to the second stator ST2.

In the present embodiment, a second rotary electric machine drive gear DG2 is connected to the second rotor RT2 via a second rotor shaft RS2 extending along the axial direction L so as to rotate integrally with the second rotor RT2. In the example shown in FIG. 2, the second rotor gear RG2 is disposed on the first axial side L1 of the second rotor RT2.

The counter gear mechanism CG includes a counter input gear 71, a counter output gear 72, and a counter shaft 73 connecting these gears 71 and 72 so as to rotate integrally.

The counter input gear 71 is an input element of the counter gear mechanism CG. In the present embodiment, the counter input gear 71 meshes with the second rotary electric machine drive gear DG2. The counter output gear 72 is an output element of the counter gear mechanism CG. In the example shown in FIG. 2, the counter output gear 72 is disposed on the second axial side L2 of the counter input gear 71. The counter output gear 72 is formed to have a smaller diameter than the counter input gear 71.

The second output differential gear mechanism DF2 distributes the rotation of the second output member O2 to the pair of second wheels W2. In the present embodiment, the second output member O2 is a second differential input gear 81 that meshes with the counter output gear 72 of the counter gear mechanism CG.

In the present embodiment, the second output differential gear mechanism DF2 is a bevel gear type differential gear mechanism. Specifically, the second output differential gear mechanism DF2 includes a hollow second differential case, a second pinion shaft supported so as to rotate integrally with the second differential case, a pair of second pinion gears rotatably supported on the second pinion shaft, and a pair of second side gears meshing with the pair of second pinion gears and functioning as output elements. The second differential case houses the second pinion shaft, the pair of second pinion gears, and the pair of second side gears.

In the present embodiment, the second differential input gear 81 serving as the second output member O2 is connected to the second differential case so as to protrude outward in the radial direction R from the second differential case. Second drive shafts DS2 drivingly connected to the second wheels W2 are connected to the pair of second side gears so as to rotate integrally with the second side gears. Thus, in the present embodiment, the second output differential gear mechanism DF2 distributes the rotation of the second output member O2 (in this case, the second differential input gear 81) to the pair of second wheels W2 via the pair of second drive shafts DS2.

Hereinafter, the positional relationship of the elements of the vehicle drive device 100 in an axial view along the axial direction L will be described with reference to FIG. 5. An arrow "V" in FIG. 5 indicates a vertical direction of the vehicle drive device 100 mounted on the vehicle (vehicle-mounted state).

Figure 5:
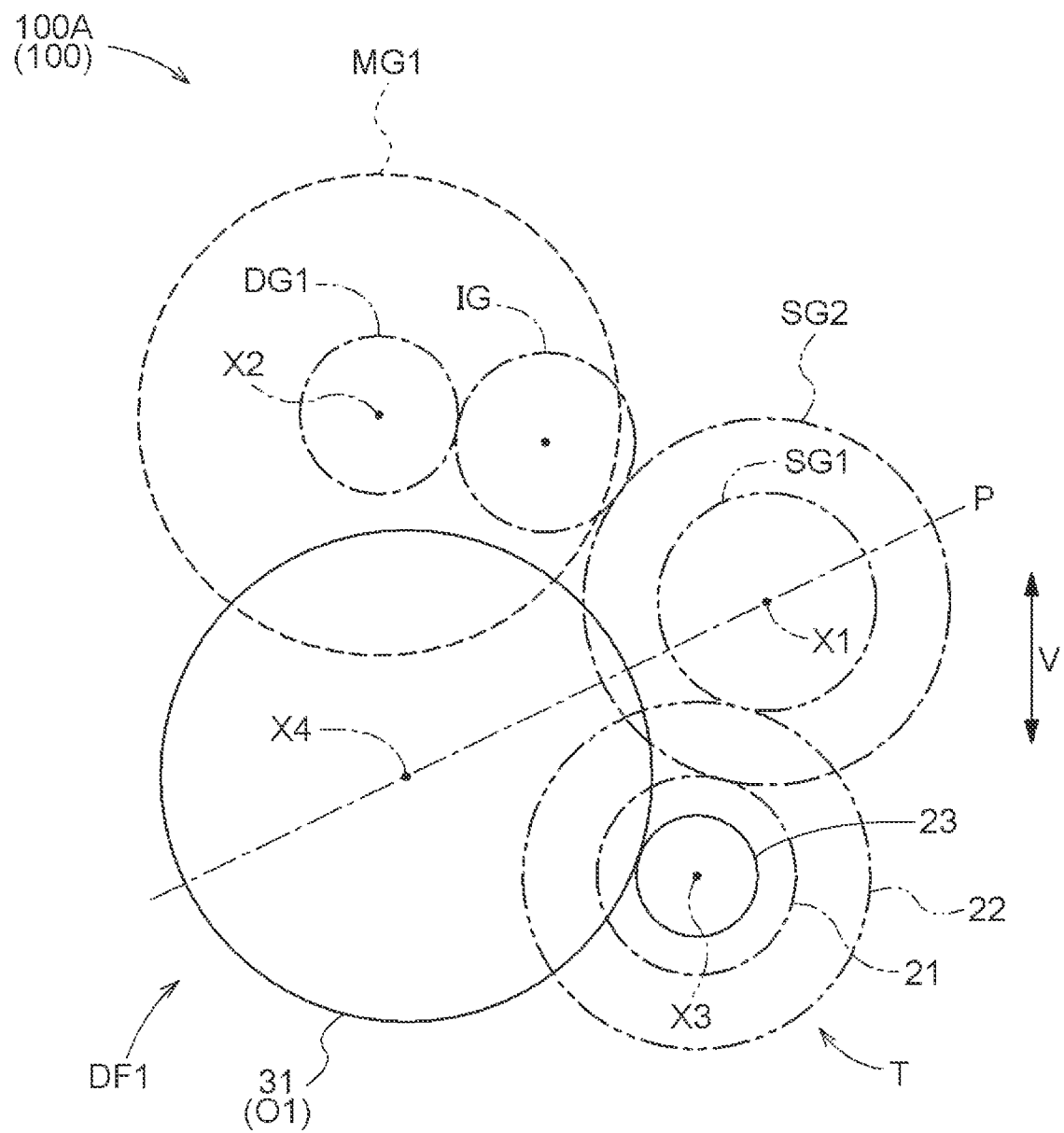
FIG. 5 is a diagram showing a positional relationship of elements in the first drive unit of the vehicle drive device according to the embodiment.

As shown in FIG. 5, in the present embodiment, the second axis X2 serving as the rotation axes of the first rotary electric machine MG1 and the first rotary electric machine drive gear DG1 is located, in the vehicle-mounted state, above a virtual plane P including the first axis X1 serving as the rotation axes of the distribution differential gear mechanism SP, the first distribution output gear SG1, the second distribution output gear SG2, and the like and the fourth axis X4 serving as the rotation axes of the first output member O1 and the first output differential gear mechanism DF1. The third axis X3 serving as the rotation axes of the first gear 21, the second gear 22, the transmission output gear 23, and the like is located below the virtual plane P in the vehicle-mounted state.

As described above, in the present embodiment, the vehicle drive device 100 (in this case, the first drive unit 100A) further includes the first output differential gear mechanism DF1 configured to distribute the rotation of the first output member O1 to the pair of first wheels W1.

The first output differential gear mechanism DF1 is disposed on the fourth axis X4 different from the first axis X1, the second axis X2, and the third axis X3.

The second axis X2 is located above the virtual plane P including the first axis X1 and the fourth axis X4 in the vehicle-mounted state.

The third axis X3 is located below the virtual plane P in the vehicle-mounted state.

According to this configuration, the first rotary electric machine MG1 and the first rotary electric machine drive gear DG1 disposed on the second axis X2 and the transmission engagement device CLt disposed on the third axis X3 can be arranged in the vertical direction V in the vehicle-mounted state. Therefore, the dimension of the vehicle drive device 100 in a direction orthogonal to the axial direction L, for example, the dimension of the vehicle drive device 100 in a vehicle fore-and-aft direction (lateral direction in FIG. 5) can be reduced easily.

As shown in FIG. 6, in the present embodiment, the vehicle drive device 100 has, as the operation modes, an electric torque converter mode (hereinafter referred to as "eTC mode"), a first EV mode, a second EV mode, a first HV mode, a second HV mode, and a charging mode.

FIG. 6 shows states of the first engagement device CL1, the second engagement device CL2, and the transmission engagement device CLt in each operation mode of the vehicle drive device 100 of the present embodiment. In the fields for the first engagement device CL1 and the second engagement device CL2 in FIG. 6, "o" indicates that the target engagement device is engaged, and "x" indicates that the target engagement device is disengaged. In the fields for the transmission engagement device CLt in FIG. 6, "Lo" indicates that the transmission engagement device CLt forms the low speed, "Hi" indicates that the transmission engagement device CLt forms the high speed, and "N" indicates that the transmission engagement device CLt is neutral.

The eTC mode is a mode in which the distribution differential gear mechanism SP amplifies the torque of the internal combustion engine EG by using the torque of the first rotary electric machine MG1 as a reaction force and transmits the amplified torque to the first output member O1, thereby causing the vehicle to travel. The eTC mode is called "electric torque converter mode" because the torque of the internal combustion engine EG can be amplified and transmitted to the first output member O1.

As shown in FIG. 6, in the eTC mode of the present embodiment, control is performed so that the first engagement device CL1 is engaged, the second engagement device CL2 is disengaged, and the transmission engagement device CLt forms the low speed. In the eTC mode of the present embodiment, the first rotary electric machine MG1 generates electric power by outputting a positive torque while rotating backward, and the distribution differential gear mechanism SP combines the driving force of the first rotary electric machine MG1 and the driving force of the internal combustion engine EG and outputs a driving force larger than the driving force of the internal combustion engine EG from the second rotation element E2 (in this case, the carrier C1). The rotation of the second rotation element E2 is shifted in the transmission mechanism T at a speed ratio corresponding to the low speed and transmitted to the first output member O1. Therefore, the eTC mode can be selected even when the charge level of the power storage device is relatively low.

The first EV mode is a mode in which the vehicle travels at a relatively low speed with the driving force of only the first rotary electric machine MG1 out of the internal combustion engine EG and the first rotary electric machine MG1. The second EV mode is a mode in which the vehicle travels at a relatively high speed with the driving force of only the first rotary electric machine MG1 out of the internal combustion engine EG and the first rotary electric machine MG1.

In the first EV mode of the present embodiment, control is performed so that the first engagement device CL1 is disengaged, the second engagement device CL2 is engaged, and the transmission engagement device CLt forms the low speed. In the second EV mode of the present embodiment, control is performed so that the first engagement device CL1 is disengaged, the second engagement device CL2 is engaged, and the transmission engagement device CLt forms the high speed.

In the first EV mode and the second EV mode of the present embodiment, the internal combustion engine EG is separated from the distribution differential gear mechanism SP by disengaging the first engagement device CL1. Therefore, the power transmission between the internal combustion engine EG and the first output member O1 is interrupted. By engaging the second engagement device CL2, the three rotation elements E1 to E3 of the distribution differential gear mechanism SP rotate integrally with each other. As a result, the rotation input from the first rotary electric machine MG1 side to the distribution differential gear mechanism SP is transmitted as it is to the first gear 21 and the second gear 22 of the transmission mechanism T. The rotation transmitted to the transmission mechanism T is shifted at the speed ratio of the low speed in the first EV mode and at the speed ratio of the high speed in the second EV mode depending on the state of the transmission engagement device CLt, and is transmitted to the first output member O1.

The first HV mode is a mode in which the vehicle travels at a relatively low speed with the driving force of at least the internal combustion engine EG out of the internal combustion engine EG and the first rotary electric machine MG1. The second HV mode is a mode in which the vehicle travels at a relatively high speed with the driving force of at least the internal combustion engine EG out of the internal combustion engine EG and the first rotary electric machine MG1.

In the first HV mode of the present embodiment, control is performed so that both the first engagement device CL1 and the second engagement device CL2 are engaged and the transmission engagement device CLt forms the low speed. In the second HV mode of the present embodiment, control is performed so that both the first engagement device CL1 and the second engagement device CL2 are engaged and the transmission engagement device CLt forms the high speed.

In the first HV mode and the second HV mode of the present embodiment, the internal combustion engine EG is connected to the distribution differential gear mechanism SP by engaging the first engagement device CL1. By engaging the second engagement device CL2, the three rotation elements E1 to E3 of the distribution differential gear mechanism SP rotate integrally with each other. As a result, the rotation input from the internal combustion engine EG side and the first rotary electric machine MG1 side to the distribution differential gear mechanism SP is transmitted as it is to the first gear 21 and the second gear 22 of the transmission mechanism T. The rotation transmitted to the transmission mechanism T is shifted at the speed ratio of the low speed in the first EV mode and at the speed ratio of the high speed in the second EV mode depending on the state of the transmission engagement device CLt, and is transmitted to the first output member O1.

The charging mode is a mode in which the power storage device is charged by causing the first rotary electric machine MG1 to generate electric power by using the driving force of the internal combustion engine EG. In the charging mode of the present embodiment, control is performed so that the first engagement device CL1 is engaged, the second engagement device CL2 is engaged, and the transmission engagement device CLt is neutral. The control is performed so that the internal combustion engine EG outputs the driving force and the first rotary electric machine MG1 outputs the driving force in a direction opposite to the rotation direction of the first rotor RT1 rotated by the driving force of the internal combustion engine EG, thereby generating electric power. In the charging mode, the vehicle may be stopped, or may travel by causing the second rotary electric machine MG2 to perform power running with electric power generated by the first rotary electric machine MG1 and transmitting the driving force of the second rotary electric machine MG2 to the second wheels W2. The mode in which the vehicle travels by the driving force of the second rotary electric machine MG2 while being in the charging mode is called "series hybrid mode".

[Other Embodiments]

(1) In the above embodiment, description has been given of the exemplary configuration in which the vehicle drive device 100 includes the first drive unit 100A and the second drive unit 100B. However, the present disclosure is not limited to such a configuration. The vehicle drive device 100 may include the first drive unit 100A but not include the second drive unit 100B. In this case, the first drive unit 100A may include the second rotary electric machine MG2.

(2) In the above embodiment, description has been given of the exemplary configuration in which the transmission mechanism T is the transmission capable of forming either one of the two shift speeds that are the low speed and the high speed. However, the present disclosure is not limited to such a configuration. The transmission mechanism T may form any one of three or more shift speeds. Alternatively, the transmission mechanism T may include a counter gear mechanism or a planetary gear mechanism to shift the rotation transmitted from the distribution differential gear mechanism SP at a constant speed ratio and transmit it to the first output member O1.

(3) In the above embodiment, description has been given of the exemplary configuration in which the second distribution output gear SG2 is drivingly connected to the first rotary electric machine drive gear DG1 via the idler gear IG. However, the present disclosure is not limited to such a configuration. The second distribution output gear SG2 may directly mesh with the first rotary electric machine drive gear DG1.

(4) In the above embodiment, description has been given of the exemplary configuration in which both the disposition area of the first distribution output gear SG1 in the axial direction L and the disposition area of the first engagement device CL1 in the axial direction L overlap the disposition area of the first rotary electric machine MG1 in the axial direction L. However, the present disclosure is not limited to such a configuration. Only one of the disposition area of the first distribution output gear SG1 in the axial direction L and the disposition area of the first engagement device CL1 in the axial direction L may overlap the disposition area of the first rotary electric machine MG1 in the axial direction L. Neither the disposition area of the first distribution output gear SG1 in the axial direction L nor the disposition area of the first engagement device CL1 in the axial direction L may overlap the disposition area of the first rotary electric machine MG1 in the axial direction L.

(5) In the above embodiment, description has been given of the exemplary configuration in which the second distribution output gear SG2 is disposed on the outer side in the radial direction R with respect to the ring gear R1 at the position where the second distribution output gear SG2 overlaps the ring gear R1 in the radial view along the radial direction R. However, the present disclosure is not limited to such a configuration. The second distribution output gear SG2 may be disposed so as not to overlap the ring gear R1 in the radial view. In that case, the second distribution output gear SG2 may be disposed at the same position in the radial direction R as the ring gear R1, or may be disposed on the inner side in the radial direction R with respect to the ring gear R1.

(6) In the above embodiment, description has been given of the exemplary configuration in which, on the third axis X3, the transmission output gear 23, the first gear 21, the transmission engagement device CLt, and the second gear 22 are disposed in this order from the second axial side L2. However, the disposition order of the first gear 21, the second gear 22, the transmission output gear 23, and the transmission engagement device CLt in the axial direction L may be changed as appropriate without being limited to such a configuration.

(7) In the above embodiment, description has been given of the exemplary configuration in which the second axis X2 is located above the virtual plane P including the first axis X1 and the fourth axis X4 in the vehicle-mounted state and the third axis X3 is located below the virtual plane P in the vehicle-mounted state. However, the positions of the first axis X1, the second axis X2, the third axis X3, and the fourth axis X4 may be changed as appropriate without being limited to such a configuration.

(8) In the above embodiment, description has been given of the exemplary configuration in which the operation mode of the vehicle drive device 100 that is realized by engaging the first engagement device CL1 and disengaging the second engagement device CL2 is the electric torque converter mode (eTC mode). However, the present disclosure is not limited to such a configuration. For example, the distribution differential gear mechanism SP may be configured to realize a so-called split hybrid mode by engaging the first engagement device CL1 and disengaging the second engagement device CL2. The split hybrid mode is a mode in which the torque of the internal combustion engine EG is distributed to the first rotary electric machine MG1 and the transmission mechanism T and a torque damped relative to the torque of the internal combustion engine EG by using the torque of the first rotary electric machine MG1 as a reaction force is transmitted to the transmission mechanism T. In this case, the order of the rotation speeds of the rotation elements of the distribution differential gear mechanism SP may be set to the order of the second rotation element E2, the first rotation element E1, and the third rotation element E3. For example, when the distribution differential gear mechanism SP is structured by a single-pinion planetary gear mechanism, the sun gear may be drivingly connected to the first rotor RT1 as the third rotation element E3, the carrier may be drivingly connected to the input member I as the first rotation element E1, and the ring gear may be used as the second rotation element E2 to serve as the output element of the distribution differential gear mechanism SP. In this mode, the first rotary electric machine MG1 generates electric power by outputting a negative torque while rotating forward, and the distribution differential gear mechanism SP outputs the torque of the internal combustion engine EG from the second rotation element E2 by using the torque of the first rotary electric machine MG1 as a reaction force. The rotation of the second rotation element E2 is transmitted to the transmission mechanism T.

(9) The configurations disclosed in the above embodiments can be applied in combination with the configurations disclosed in other embodiments as long as there is no contradiction. Regarding the other configurations, the embodiments disclosed herein are merely illustrative in all respects. Therefore, various modifications can be made as appropriate without departing from the spirit of the present disclosure.

[Outline of Embodiment Described Above]

Hereinafter, the outline of the vehicle drive device (100) described above will be described.

The vehicle drive device (100) includes:
an input member (I) drivingly connected to an internal combustion engine (EG);
an output member (O1) drivingly connected to wheels (W1);
a rotary electric machine (MG1) including a rotor (RT1);
a rotary electric machine drive gear (DG1) drivingly connected to the rotor (RT1);
a transmission mechanism (T) including a transmission engagement device (CLt) configured to switch a state of power transmission;
a distribution differential gear mechanism (SP) including a first rotation element (E1) drivingly connected to the input member (I), a second rotation element (E2) drivingly connected to the transmission mechanism (T), and a third rotation element (E3) drivingly connected to the rotary electric machine drive gear (DG1);
a first distribution output gear (SG1) connected to the second rotation element (E2) so as to rotate integrally with the second rotation element (E2); and
a disconnection engagement device (CL1) configured to connect or disconnect power transmission between the input member (1) and the first rotation element (E1), in which
the transmission mechanism (T) is configured to transmit rotation transmitted from the distribution differential gear mechanism (SP) to the output member (O1),
the distribution differential gear mechanism (SP), the first distribution output gear (SG1), and the disconnection engagement device (CL1) are disposed on a first axis (X1),
the rotary electric machine (MG1) and the rotary electric machine drive gear (DG1) are disposed on a second axis (X2) different from the first axis (X1),
the transmission engagement device (CLt) is disposed on a third axis (X3) different from the first axis (X1) and the second axis (X2),
an axial direction (L) of the rotary electric machine (MG1) includes a first axial side (L1) where the rotary electric machine (MG1) is disposed with respect to the rotary electric machine drive gear (DG1), and a second axial side (L2) opposite to the first axial side (L1), and
the distribution differential gear mechanism (SP) is disposed on the second axial side (L2) of the first distribution output gear (SG1) and the disconnection engagement device (CL1).

According to this configuration, the combination of the distribution differential gear mechanism (SP), the first distribution output gear (SG1), and the disconnection engagement device (CL1), the combination of the rotary electric machine (MG1) and the rotary electric machine drive gear (DG1), and the transmission engagement device (CLt) are disposed on different axes. Thus, the dimension of the vehicle drive device (100) in the axial direction (L) can easily be reduced compared to a configuration in which some or all of them are disposed coaxially.

In such a configuration, the rotary electric machine drive gear (DG1) is disposed on the second axial side (L2) of the rotary electric machine (MG1), and the distribution differential gear mechanism (SP) is disposed on the second axial side (L2) of the first distribution output gear (SG1) and the disconnection engagement device (CL1). That is, the rotary electric machine drive gear (DG1) and the distribution differential gear mechanism (SP) are disposed on the same side in the axial direction (L) with respect to the other elements disposed coaxially therewith. Therefore, both the rotary electric machine (MG1) and the combination of the first distribution output gear (SG1) and the disconnection engagement device (CL1) can be disposed in an area on the first axial side (L1) of the rotary electric machine drive gear (DG) and the distribution differential gear mechanism (SP) while the third rotation element (E3) of the distribution differential gear mechanism (SP) and the rotary electric machine drive gear (DG1) are drivingly connected appropriately. Accordingly, the dimension of the vehicle drive device (100) in the axial direction (L) can easily be reduced in the configuration including the input member (I), the output member (O1), the rotary electric machine (MG1), the distribution differential gear mechanism (SP), the transmission mechanism (T), and the disconnection engagement device (CL1).

It is preferable that both a disposition area of the first distribution output gear (SG1) in the axial direction (L) and a disposition area of the disconnection engagement device (CL1) in the axial direction (L) overlap a disposition area of the rotary electric machine (MG1) in the axial direction (L).

According to this configuration, the dimension of the vehicle drive device (100) in the axial direction (L) can be reduced compared to a configuration in which the disposition area of at least one of the first distribution output gear (SG1) and the disconnection engagement device (CL1) in the axial direction (L) does not overlap the disposition area of the rotary electric machine (MG1) in the axial direction (L).

It is preferable that the vehicle drive device (100) further include a second distribution output gear (SG2) connected to the third rotation element (E3) so as to rotate integrally with the third rotation element (E3),
the distribution differential gear mechanism (SP) be a planetary gear mechanism including a sun gear (S1), a carrier (C1), and a ring gear (R1),
the third rotation element (E3) be the ring gear (R1),
the second distribution output gear (SG2) be disposed on the first axis (X1) and on an outer side in a radial direction (R) with respect to the ring gear (R1),
the transmission mechanism (T) include a first gear (21) disposed on the third axis (X3) and meshing with the second distribution output gear (SG2), and
the ring gear (R1) and the second distribution output gear (SG2) overlap each other in a radial view along the radial direction (R).

According to this configuration, the dimension of the vehicle drive device (100) in the axial direction (L) can be reduced compared to a configuration in which the ring gear (R1) and the second distribution output gear (SG2) do not overlap each other in the radial view along the radial direction (R).

According to this configuration, the second distribution output gear (SG2) connected to the ring gear (R1) serving as the third rotation element (E3) drivingly connected to the rotary electric machine drive gear (DG1) so as to rotate integrally with the ring gear (R1) is disposed on the outer side in the radial direction (R) with respect to the ring gear (R1). Therefore, the second distribution output gear (SG2) and the rotary electric machine drive gear (DG1) can easily mesh with each other directly or indirectly. Thus, the rotary electric machine drive gear (DG1) and the third rotation element (E3) can be drivingly connected appropriately.

In the configuration including the second distribution output gear (SG2),
- it is preferable that the vehicle drive device (100) further include an output differential gear mechanism (DF1) including a differential input gear (31) serving as the output member (O1) and configured to distribute rotation of the differential input gear (31) to a pair of the wheels (W1),
- the transmission mechanism (T) further include a second gear (22) disposed on the third axis (X3) and meshing with the first distribution output gear (SG1), and a transmission output gear (23) disposed on the third axis (X3) and meshing with the differential input gear (31), and
- on the third axis, the transmission output gear (23), the first gear (21), the transmission engagement device (CLt), and the second gear (22) be disposed in this order from the second axial side (L2).

According to this configuration, the transmission mechanism (T) can be structured as a parallel-shaft gear transmission including the second distribution output gear (SG2) and the first gear (21) that mesh with each other, and the first distribution output gear (SG1) and the second gear (22) that mesh with each other. In addition, the rotation shifted by the transmission can be transmitted to the pair of wheels (W1) via the output differential gear mechanism (DF1).

According to this configuration, the transmission engagement device (CLt) is disposed between the first gear (21) and the second gear (22) in the axial direction (L). Thus, the transmission engagement device (CLt) can easily switch the states of power transmission of the first gear (21) and the second gear (22).

In the configuration including the output differential gear mechanism (DF1),
- it is preferable that, assuming the disconnection engagement device as a first engagement device (CL1),
- the vehicle drive device (100) further include a second engagement device (CL2) configured to connect or disconnect power transmission between two elements selected from among three rotation elements that are the first rotation element (E1), the second rotation element (E2), and the third rotation element (E3), and
- a disposition area of the second engagement device (CL2) in the axial direction (L) overlap a disposition area of the transmission output gear (23) in the axial direction (L).

According to this configuration, the dimension of the vehicle drive device (100) in the axial direction (L) can be reduced compared to a configuration in which the disposition area of the second engagement device (CL2) in the axial direction (L) does not overlap the disposition area of the transmission output gear (23) in the axial direction (L).

It is preferable that the vehicle drive device (100) further include an output differential gear mechanism (DF1) configured to distribute rotation of the output member (O1) to a pair of the wheels (W1),
- the output differential gear mechanism (DF1) be disposed on a fourth axis (X4) different from the first axis (X1), the second axis (X2), and the third axis (X3),
- the second axis (X2) be located above a virtual plane (P) including the first axis (X1) and the fourth axis (X4) in a vehicle-mounted state, and
- the third axis (X3) be located below the virtual plane (P) in the vehicle-mounted state.

According to this configuration, the rotary electric machine (MG1) and the rotary electric machine drive gear (DG1) disposed on the second axis (X2) and the transmission engagement device (CLt) disposed on the third axis (X3) can be arranged in the vertical direction (V) in the vehicle-mounted state. Therefore, the dimension of the vehicle drive device (100) in a direction orthogonal to the axial direction (L), for example, the dimension of the vehicle drive device (100) in a vehicle fore-and-aft direction can be reduced easily.

INDUSTRIAL APPLICABILITY

The technology according to the present disclosure is applicable to a vehicle drive device including an input member drivingly connected to an internal combustion engine, an output member drivingly connected to wheels, a rotary electric machine, a transmission mechanism including a transmission engagement device for switching the state of power transmission, and a distribution differential gear mechanism.

DESCRIPTION OF THE REFERENCE NUMERALS

100: vehicle drive device, I: input member, O1: first output member (output member), MG1: first rotary electric machine (rotary electric machine), RT1: first rotor (rotor), DG1; first rotary electric machine drive gear (rotary electric machine drive gear), T: transmission mechanism, SP: distribution differential gear mechanism, E1: first rotation element, E2: second rotation element, E3: third rotation element E3, SG1: first distribution output gear, CL1: first engagement device (disconnection engagement device), CLt: transmission engagement device, EG: internal combustion engine, W1: first wheel (wheel), L: axial direction, L1: first axial side, L2: second axial side, X1: first axis, X2: second axis, X3: third axis

The invention claimed is:
1. A vehicle drive device comprising:
an input member drivingly connected to an internal combustion engine;
an output member drivingly connected to wheels;
a rotary electric machine including a rotor;
a rotary electric machine drive gear drivingly connected to the rotor;
a transmission mechanism including a transmission engagement device configured to switch a state of power transmission;
a distribution differential gear mechanism including a first rotation element drivingly connected to the input member, a second rotation element drivingly connected to the transmission mechanism, and a third rotation element drivingly connected to the rotary electric machine drive gear;
a first distribution output gear connected to the second rotation element so as to rotate integrally with the second rotation element;
a disconnection engagement device configured to connect or disconnect power transmission between the input member and the first rotation element, wherein the transmission mechanism is configured to transmit rotation transmitted from the distribution differential gear mechanism to the output member, the distribution differential gear mechanism, the first distribution output gear, and the disconnection engagement device are disposed on a first axis, the rotary electric machine and the rotary electric machine drive gear are disposed on a second axis different from the first axis, the transmission engagement device is disposed on a third axis different from the first axis and the second axis, an axial direction of the rotary electric machine includes a first axial side where the rotary electric machine is disposed with respect to the rotary electric machine drive gear, and a second axial side opposite to the first axial side, the distribution differential gear mechanism is disposed on the second axial side of the first distribution output gear and the disconnection engagement device, and the transmission engagement device overlaps the first distribution output gear in a radial view along the radial direction; and a second distribution output gear connected to the third rotation element so as to rotate integrally with the third rotation element, wherein the distribution differential gear mechanism is a planetary gear mechanism including a sun gear, a carrier, and a ring gear, the third rotation element is the ring gear, the second distribution output gear is disposed on the first axis and on an outer side in a radial direction with respect to the ring gear, the transmission mechanism includes a first gear disposed on the third axis and meshing with the second distribution output gear, and the ring gear and the second distribution output gear overlap each other in a radial view along the radial direction.

2. The vehicle drive device according to claim 1, wherein both a disposition area of the first distribution output gear in the axial direction and a disposition area of the disconnection engagement device in the axial direction overlap a disposition area of the rotary electric machine in the axial direction.

3. The vehicle drive device according to claim 2, further comprising
an output differential gear mechanism configured to distribute rotation of the output member to a pair of the wheels, wherein
the output differential gear mechanism is disposed on a fourth axis different from the first axis, the second axis, and the third axis,
the second axis is located above a virtual plane including the first axis and the fourth axis in a vehicle-mounted state, and
the third axis is located below the virtual plane in the vehicle-mounted state.

4. The vehicle drive device according to claim 1, further comprising
an output differential gear mechanism including a differential input gear serving as the output member and configured to distribute rotation of the differential input gear to a pair of the wheels, wherein
the transmission mechanism further includes a second gear disposed on the third axis and meshing with the first distribution output gear, and a transmission output gear disposed on the third axis and meshing with the differential input gear, and
on the third axis, the transmission output gear, the first gear, the transmission engagement device, and the second gear are disposed in this order from the second axial side.

5. The vehicle drive device according to claim 4, further comprising,
assuming the disconnection engagement device as a first engagement device,
a second engagement device configured to connect or disconnect power transmission between two elements selected from among three rotation elements that are the first rotation element, the second rotation element, and the third rotation element, wherein
a disposition area of the second engagement device in the axial direction overlaps a disposition area of the transmission output gear in the axial direction.

6. The vehicle drive device according to claim 5, further comprising
an output differential gear mechanism configured to distribute rotation of the output member to a pair of the wheels, wherein
the output differential gear mechanism is disposed on a fourth axis different from the first axis, the second axis, and the third axis,
the second axis is located above a virtual plane including the first axis and the fourth axis in a vehicle-mounted state, and
the third axis is located below the virtual plane in the vehicle-mounted state.

7. The vehicle drive device according to claim 4, further comprising
an output differential gear mechanism configured to distribute rotation of the output member to a pair of the wheels, wherein
the output differential gear mechanism is disposed on a fourth axis different from the first axis, the second axis, and the third axis,
the second axis is located above a virtual plane including the first axis and the fourth axis in a vehicle-mounted state, and
the third axis is located below the virtual plane in the vehicle-mounted state.

8. The vehicle drive device according to claim 1, further comprising
an output differential gear mechanism configured to distribute rotation of the output member to a pair of the wheels, wherein
the output differential gear mechanism is disposed on a fourth axis different from the first axis, the second axis, and the third axis,
the second axis is located above a virtual plane including the first axis and the fourth axis in a vehicle-mounted state, and
the third axis is located below the virtual plane in the vehicle-mounted state.

* * * * *